United States Patent Office 3,189,603
Patented June 15, 1965

3,189,603
PROCESS FOR THE PRODUCTION OF 2-CYCLO-ALKYLAMINO DERIVATIVES OF 1,4-BENZO-DIAZEPINES
Heinz M. Wuest, New York, N.Y., assignor to Warner-Lambert Pharmaceutical Company, Morris Plains, N.J., a corporation of Delaware
No Drawing. Original application Apr. 9, 1962, Ser. No. 204,301, now Patent No. 3,138,586, dated June 23, 1964. Divided and this application Mar. 27, 1964, Ser. No. 356,014
3 Claims. (Cl. 260—239)

This application is a divisional application of my co-pending application, Serial No. 204,301 filed April 9, 1962, now U.S. Patent 3,138,586.

This invention relates to 1,4-benzodiazepines. More particularly, this invention relates to a novel process for the production of 2-cycloalkylamino derivatives of 1,4-benzodiazepines having the formula:

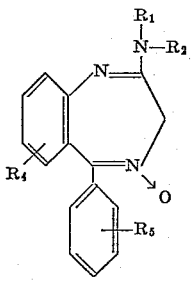

wherein $R_1$ represents hydrogen; $R_2$ represents a cycloparaffin group such as cyclopropyl, cyclopropylmethyl, cyclobutyl or cyclopentyl and $R_4$ and $R_5$ each represents hydrogen, halogen such as chlorine and bromine, lower alkyl such as methyl, ethyl or propyl and lower alkoxy such as methoxy or ethoxy. The symbols $R_1$, $R_2$, $R_4$ and $R_5$ as used hereinafter have the same meaning as defined.

The above compounds are important thereapeutic agents. They are useful, for example, as tranquilizers. In addition, they are important intermediates for the production of other 1,4-benzodiazepines.

In accordance with my invention the above compounds are synthesized by reacting an intermediate compound represented by the following structural formula:

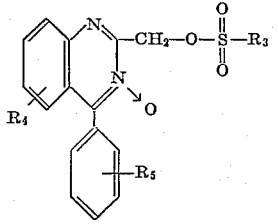

wherein $R_3$ represents a lower alkyl group such as methyl, ethyl or propyl or an aryl group such as phenyl or tolyl with an excess of cycloalkyl or cycloalkylalkylamine of the formula $R_2NH_2$.

Suitable amines useful for this reaction are, for example, cyclopropylamine, cyclopropylmethylamine, cyclobutylamine and cyclopentylamine.

The reaction is generally effected at a temperature range of $-5°$ to $0°$ C. over a period of about 12 to 18 hours. The precipitated reaction product may be recovered from the reaction medium by conventional means such as by filtration or centifugation. The starting intermediate useful for this reaction is described and claimed in copending application Serial No. 305,503.

The foregoing reaction may be conveniently expressed in the following equation:

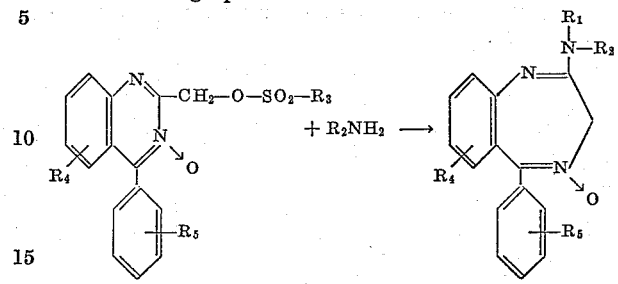

The following examples are included in order further to illustrate the invention.

Example 1

To a solution of 4.70 g. of cyclopropylamine in 3.62 ml. of methanol is added 2.00 g. of 2-mesyloxymethyl-4-phenyl-6-chloroquinazoline-3-oxide and the mixture is maintained at $-5°$ to $0°$ C. for 16–18 hours. A white crystalline precipitate of 7-chloro-2-cyclopropylamino-5-phenyl-3H-1,4-benzodiazepine-4-oxide is formed which melts at $222°-232°$ C. The compound is filtered off and recrystallized from methanol, the recrystallized product melting at $248°-251°$ C.

Example 2

To a solution of 17.6 g. of cyclopropylmethylamine in 13.4 ml. of methanol is added 6.0 g. of 2-mesyloxymethyl-4-phenyl-6-chloroquinazoline-3-oxide and the mixture is maintained at $-5°$ to $0°$ C. for 16–18 hours. The white crystalline precipitate of 7-chloro-2-cyclopropylmethyl-amino-5-phenyl-3H-1,4-benzodiazepine-4-oxide which is obtained melts at $223.5°-228°$ C. To the filtrate an additional 6.00 g. of 2-mesyloxymethyl-4-phenyl-6-chloroquinazoline-3-oxide is added and a second crop of the benzodiazepine derivative is obtained on completion of the reaction. The second crop is removed by filtration and combined with the first crop. The combined crops are recrystallized from methanol to give purified 7-chloro-2-cyclopropylmethylamino - 5 - phenyl-3H-1,4-benzodiazepine-4-oxide which melts at $238°-239°$ C.

It is understood that the foregoing detailed description is given merely by way of illustration and that many variations may be made therein without departing from the spirit of my invention.

Having described my invention, what I desire to secure by Letters Patent is:

1. Process for the production of a compound of the formula:

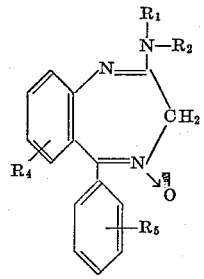

wherein $R_1$ represents hydrogen; $R_2$ is a cycloparaffin group having 3 to 4 carbon atoms and $R_4$ and $R_5$ represent a member of the group consisting of hydrogen and halogen which comprises reacting 2-mesyloxymethyl-4-phenyl-6-$R_4$-quinazoline-3-oxide with an amine $R_2$—$NH_2$ wherein $R_2$ is as defined.

2. A process for the production of 7-chloro-2-cyclopropylamino-5-phenyl - 3H - 1,4 - benzodiazepine-4-oxide which comprises reacting 2-mesyloxymethyl-4-phenyl-6-chloro-quinazoline-3-oxide with cyclopropylamine.

3. A process for the production of 7-chloro-2-cyclopropylmethylamino-5-phenyl-3H - 1,4 - benzodiazepine-4-oxide which comprises reacting 2-mesyloxymethyl-4-phenyl-6-chloroquinazoline - 3 - oxide with cyclopropylmethylamine.

References Cited by the Examiner

UNITED STATES PATENTS 2,893,992   7/59   Sternbach _____ 260—239

OTHER REFERENCES

Houben-Weyl, Methoden der Organischen Chemie, vol. 11/1 (Stuttgart, 1957), pages 26 and 217–220.

Wagner et al., Synthetic Organic Chemisty (New York, 1953), pages 666–668.

NICHOLAS S. RIZZO, *Primary Examiner.*

WALTER A. MODANCE. *Examiner.*